Oct. 17, 1950 G. L. BECKSTROM 2,526,320
SPRING FASTENING MEANS
Filed July 5, 1945 2 Sheets-Sheet 1
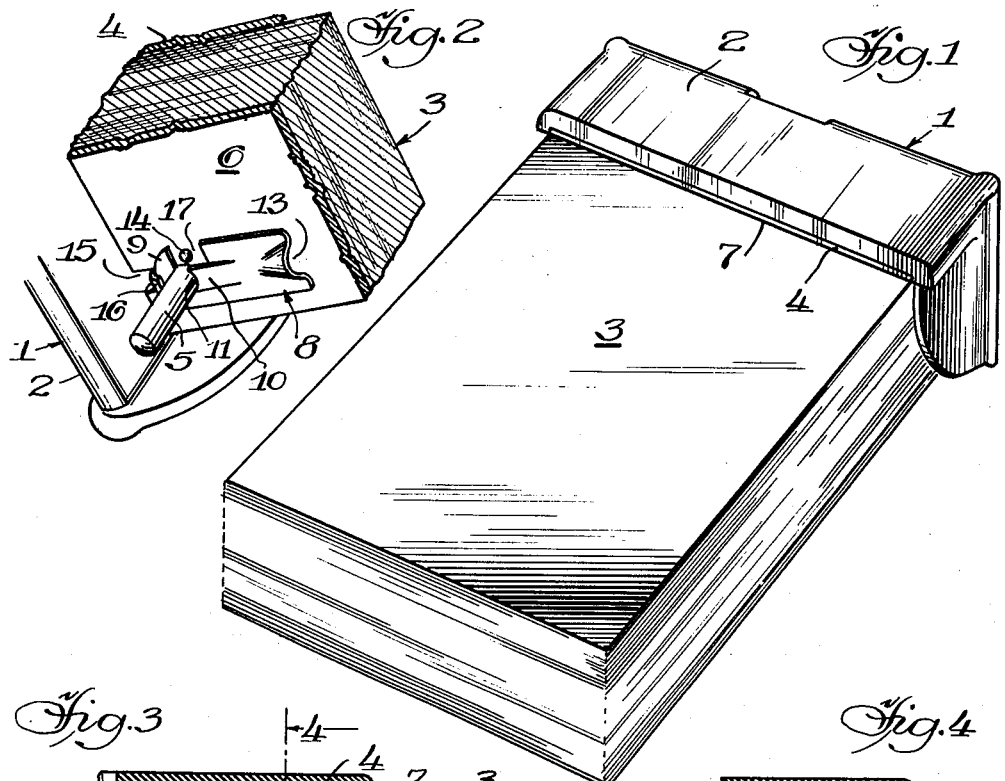
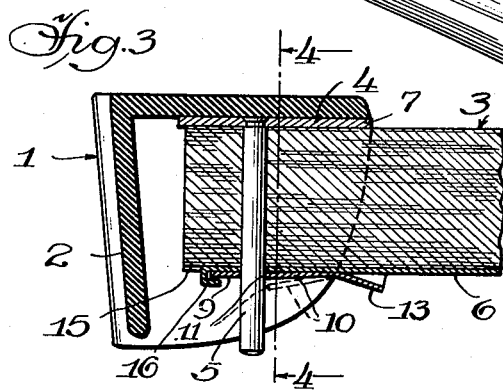
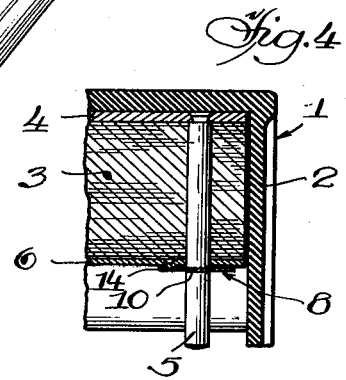
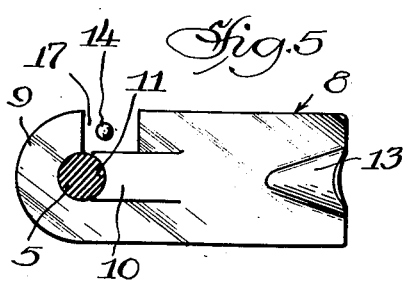
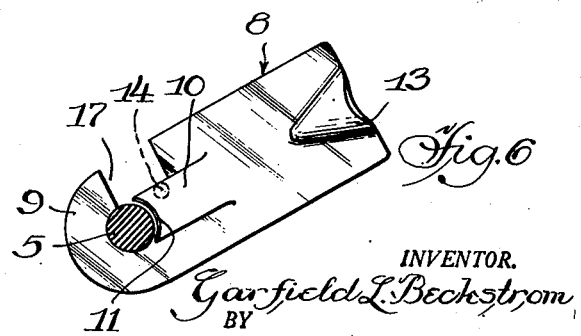
INVENTOR.
Garfield L. Beckstrom
BY
Parkinson + Lane
Attys.

Oct. 17, 1950   G. L. BECKSTROM   2,526,320
SPRING FASTENING MEANS
Filed July 5, 1945                                2 Sheets-Sheet 2
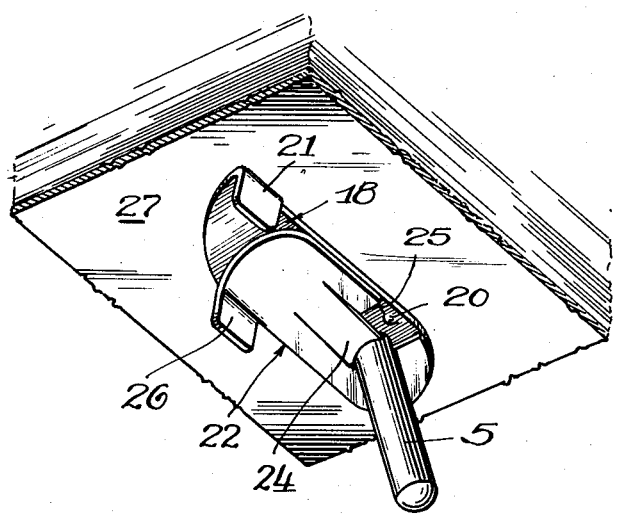
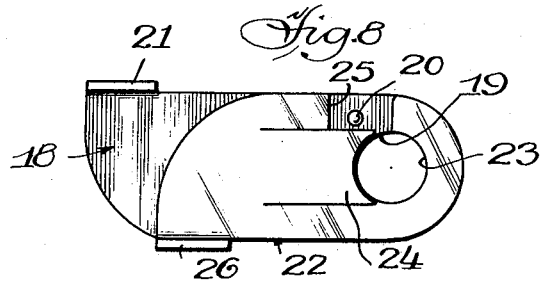
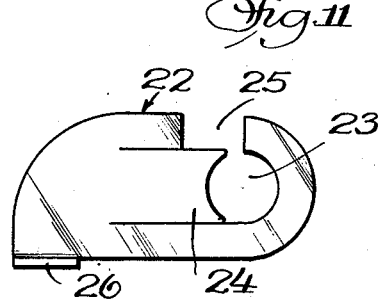
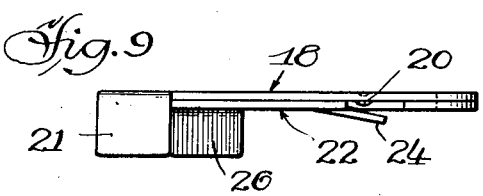
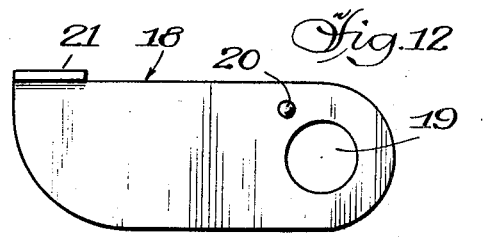
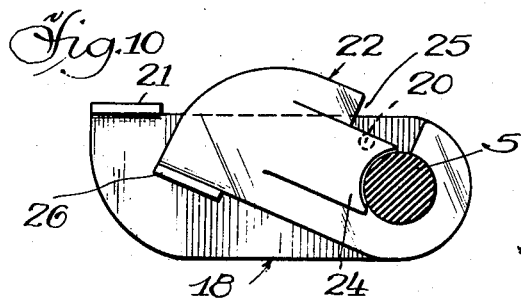
INVENTOR.
Garfield L. Beckstrom
BY
Parkinson & Lane
Attys.

Patented Oct. 17, 1950

2,526,320

UNITED STATES PATENT OFFICE 2,526,320

SPRING FASTENING MEANS

Garfield L. Beckstrom, Chicago, Ill., assignor to Autopoint Company, Chicago, Ill., a corporation of Illinois Application July 5, 1945, Serial No. 603,323

10 Claims. (Cl. 281—15)

The present invention relates to spring fastening means of the type that may be quickly engaged or disengaged from a stud, bolt or the like.

Among the objects of the present invention is to provide a fastening means and especially a novel spring fastening device that may be quickly and effectively locked or released, as the occasion requires.

Another object of the invention is the provision of a novel spring fastening means adapted to be automatically released upon rotation thereof. To accomplish this result the spring fastening means is rotatable and in that rotation, engages a detent provided in a base plate which automatically disengages the fastening means from its locking engagement with a stud, pin, bolt or the like.

A still further object of the present invention is to provide novel means and mechanism for retaining a desk pad in a holder in such manner that the pad may be quickly assembled, removed or replaced, and securely retained regardless of the thickness of the pad.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in perspective of a loose leaf desk pad holder employing the present invention.

Figure 2 is a fragmentary perspective view showing one corner of the underside of the desk pad holder and showing one embodiment of the spring fastening means provided on the base and locking onto the stud.

Figure 3 is a fragmentary view in vertical cross section through the corner of the pad holder and showing the fastening means locked upon the stud or pin, the resilient tongue being also shown in dotted outline in its released position.

Figure 4 is a fragmentary view in vertical cross section taken on the line 4—4 of Figure 3.

Figure 5 is a plan view of the spring fastening means or clip when in holding or locked position upon the stud and also showing the position of the releasing teat or detent.

Figure 6 is a view similar to Figure 5 but with the fastening means or clip moved or rotated to a position for releasing the resilient tongue from the stud.

Figure 7 is a perspective view of an alternate form of spring fastening means in which the assembly comprises a pair of members adapted to be locked onto a stud, pin or other projection.

Figure 8 is a plan view of the alternate form of spring fastening assembly.

Figure 9 is a side view thereof.

Figure 10 is a view similar to Figure 8 but with the clip member rotated with respect to the base member to release the former from the stud or projection.

Figure 11 is a plan view of the spring clip or fastening member of this alternate construction.

Figure 12 is a plan view of the base member for the alternate form of assembly.

Referring more particularly to the illustrative embodiment of Figures 1 to 6, inclusive, the novel fastening means is shown associated with a desk pad holder 1 having a head or body portion 2 for the reception of a loose leaf pad, desk calendar or similar article 3. This pad is retained in position by having the upper end thereof disposed and clamped between a plate 4 carrying a pair of depending studs, pins or projections 5 shown as passing through openings in the pad, and a base or bottom plate 6. The used upper sheet or sheets may be completely withdrawn or they may be torn off along the edge 7, as desired.

In order to clamp and retain the pad in position but to permit its ready removal, when the occasion requires, the invention comprehends a novel fastening means comprising a spring clip 8 having an arcuate part 9 substantially encompassing each stud, pin or projection 5 and bearing against the underside of the base plate 6 for forcing this plate upwardly into engagement with the stack of sheets or pad 3. This clip or fastener is provided with a resilient tongue 10 preferably cut or stamped from the body of the clip with its edge 11 so contoured as to substantially conform to the curvature of the stud and of such length that when the edge of the tongue is pressed or forced into contact with the stud, the base or bottom plate 6 is tightly held against the underside of the pad 3 and the clip and parts are locked or retained in assembled relation.

To permit the clip or fastening means to be quickly and automatically released as when inserting a new pad or where the sheets of the pad are removed so that the pad decreases in thickness, this clip is rotatably mounted about the stud or pin and to facilitate such rotation or turning movement, the outer end of the clip is provided with an elevated portion or embossment 13 that may be manually engaged to swing the clip through an arc sufficient to cause the undersurface of the tongue 10 to engage and ride over a detent or teat 14 provided on the adjacent face of the base 6 and thereby automatically disengaging the edge 11 of the tongue from its locking engagement with the stud or pin. This operation is shown in Figure 6 and Figure 3 shows the resilient tongue in dotted outline in the position which it assumes when it is released from the stud or pin.

In order to retain the clip or fastening means on the underside of the base, the edge of the base is preferably cut away at 15 to provide an inwardly bent or rearwardly projecting lip 16. This lip permits the clip to be rotated manually for leasing the resilient tongue or to return this tongue to a position to engage the stud. The clip is preferably notched or cut away at 17 and when rotated through an angle of approximately 90° from its normal locked or latched position, this cut-out is moved into alignment and coinciding relation with the lip or projection 16 and is of such width as to permit the clip to be removed from the stud and base.

Figures 7 to 12, inclusive, disclose an alternate construction in which the spring fastening means comprises a unit assembly consisting of a base member 18 provided with an opening 19 adapted to conformably fit over a stud, pin or other projection 5. On this base is provided a detent or teat 20 and at one end thereof is formed or provided an upstanding projection or flange 21.

Disposed above or adjacent this base member is a spring clip 22 quite similar to that shown in Figures 2 to 6, inclusive, and provided with an opening 23 for receiving a stud, pin or projection 5, a resilient tongue 24, a cut-out 25 and an upstanding projection or flange 26. The flange 26 facilitates rotation or manual turning of the clip in such direction as to move the resilient tongue over the detent 20 (see Figure 10) to thereby raise and disengage the tongue from its locking engagement with the stud or pin.

Although the spring clip is similar in the two forms of the invention, the clip 8 is shown associated or combined with a base or plate 6 such as that employed or illustrated with a desk pad holder, whereas the unit shown in Figures 7 to 12, inclusive, which includes the spring clip 22 and a separate base 18, may be employed as a fastening means for many and varied uses which will become apparent to those skilled in the art. In Figure 7 the assembly or unit is shown as mounted on a stud or pin 5 which may project from or through any suitable support 27. Both forms operate in a similar manner, the clip 8 when released disengaging the base 6, while the clip 22 disengages the fastening means from the stud or pin.

Having thus disclosed my invention, I claim:

1. In combination, a member having an aperture, a pin extending through said aperture and projecting beyond said member, and releasable latching means operative to restrain said pin against axial movement in one direction relatively to said member while permitting free axial movement thereof in the opposite direction, said latching means comprising a plate embracing said pin and having a spring tongue anchored at one end and projecting radially from its anchorage toward said pin and at a small angle to the plane normal to the axis of the pin and away from said member and bearing at its free end against the side of said pin, said plate bearing against said member and being effective to restrain said pin against axial movement in said one direction through said aperature, and a detent on said member operative in response to rotation of said plate about the axis of said pin to flex said tongue to effect a movement of the free end thereof out of engagement with said pin whereby to release said pin.

2. In combination, a member having an aperture, a pin extending through said aperture and projecting beyond said member, and releasable latching means operating to restrain said pin against axial movement in one direction relatively to said member while permitting free axial movement thereof relatively to said member in the opposite direction, said latching means comprising a sheet metal clip apertured to pass said pin and having an integral spring tongue anchored at one end and having its free end in latching engagement with said pin, said tongue projecting at an angle to the plane normal to the axis of said pin and away from said member, said clip bearing against said member and effective by virtue of the gripping action of said tongue to lock said pin against axial movement in said one direction through said aperture, and a projection on said member operative in response to rotation of said clip about said pin to flex said tongue out of latching engagement with the pin whereby to release said pin.

3. A fastening clip adapted to be manufactured as a separate article but intended to be employed in combination with a complementary member having a stud projecting therefrom or therethrough to produce a quick-releasable union of clip and stud, comprising a stud, a main portion on the clip having an aperture therethrough adapted to receive said stud and a surface adapted static-frictionally to abut said complementary member, an integral resilient tongue portion projecting away from said complementary member but toward and defining an arcuate part of said aperture, whereby tight abutment of said clip against said complementary member is effective releasably to unite said clip, stud and complementary member, and a detent on the complementary member and normally spaced from the tongue portion for disengaging the latter from the stud upon rotation of the clip.

4. A fastening clip adapted to be manufactured as a separate article but intended to be employed in combination with a complementary member having a stud projecting therefrom or therethrough to produce a quick-releasable union of clip, stud and complementary member, comprising a stud a main portion on the clip having an aperture therethrough adapted to receive said stud, a surface adapted static-frictionally to abut said complementary member, and an integral resilient tongue portion projecting away from said complementary member but toward and defining an arcuate part of said aperture whereby tight abutment of said clip against said complementary member is effective releasably to unite said clip, stud and said complementary member, said clip being formed with a notch in communication with said aperture to facilitate lateral relative displacements between clip and stud, and a detent on the complementary member and normally spaced from the tongue portion for disengaging the latter from the stud upon rotation of the clip.

5. In a desk pad holder, an apertured base and a pin passing through the aperture in the base, and a fastener for mounting the base upon the pin comprising a fastening clip formed with an aperture therethrough for receiving said pin and having an integral spring-tongue defining a part of the last-named aperture, said tongue being anchored at one end and having its other end free for latching engagement with said pin when said clip tightly abuts said base, said clip being formed with a radial notch substantially normal to said tongue, said base having an integral lip bearing on said clip to restrain axial movement of said clip relative to said base, and an integral projection on said base normally in registry with said notch but operative to release said tongue from said pin upon rotation of the clip relative to said pin and projection, such rotation also being effective to bring said notch into registry with said lip and to permit complete removal of said clip from said pin.

6. In a desk pad holder, a top member having a depending pin, an apertured base through which said pin projects, a pad positioned intermediate said top member and base, and a rotatable fastener for adjustably securing the base to the pin comprising a fastening clip formed with an aperture therethrough for receiving said pin and having an integral spring-tongue defining a part of the last-named aperture, said tongue being adapted to press into tight engagement with said pin when said clip is pressed into tight abutment with said base by the downward force exerted by the compression of said pad and/or the weight of said base, and a detent on the base for disengaging the spring-tongue from the pin upon rotation of the fastening clip.

7. In a desk pad holder, an upper plate having a depending stud, a base plate located upon the stud and adjustable with respect thereto, a pad positioned between the upper and base plates, a fastening clip apertured to receive the stud and freely located on the base plate but normally in static frictional engagement therewith, said clip being provided with a resilient part anchored at one end and having its free end projecting toward the stud for latching engagement therewith, said part when unlatched projecting at an angle to the plane normal to the axis of the stud and when moved into a plane substantially normal to the axis of the stud it latches the clip and base plate onto the stud and thereby clamps the pad between the plates, and a projection on the base plate engaging and quickly releasing the resilient part and permitting ready removal of the clip and base plate when the clip is rotated about the stud.

8. In a desk pad holder, an upper plate having a depending stud, a base located upon the stud and adjustable with respect thereto, a pad positioned between the upper plate and base, a fastening clip rotatable on the stud and freely located on the base but normally in static frictional engagement therewith and provided with a resilient tongue anchored at one end and having its free end projecting toward the stud for latching engagement therewith, said tongue when unlatched from the stud projecting at an angle to the plane normal to the axis of the stud and when moved into a plane substantially normal to the axis of the stud latches the clip and base onto the stud for clamping the pad between the plate and base, and a detent on the base for forcing the resilient tongue out of latching engagement with the stud upon rotation of the clip.

9. Fastening means for latching onto a stud, pin or other projection, comprising a pair of members including a clip member having an aperture therethrough for receiving the projection whereby said clip member is adapted to be rotated with respect to the other member, a resilient tongue on the clip member and projecting therefrom with its free end extending toward and defining a portion of said aperture and adapted to latch onto the projection, said tongue when unlatched projecting at an angle to the plane normal to the axis of the projection and when moved into a plane substantially normal to the axis of the projection, latches the clip member upon the projection and retains the other member in fixed position, and a detent on the other member whereby upon rotation of the clip member relative to the other member the resilient tongue engages said detent and is automatically released from its latching engagement and thereby releases the clip and base members relative to the stud.

10. In combination, a member provided with a smooth surfaced pin projecting therefrom, and fastening means for latching onto said pin and comprising a base member freely shiftable axially of the pin and a fastening clip associated with said base member for retaining the latter in a desired position on the pin, said fastening clip being provided with an aperture for receiving the pin and rotatable thereon and a resilient tongue projecting from the clip toward the aperture and pin and having its free end disposed adjacent the pin and contoured in conformity with the pin for latching engagement therewith, said resilient tongue when unlatched projecting at an angle to the plane normal to the axis of the pin and when moved into a plane substantially normal to the axis of the pin, latches the clip and base member onto the pin, and a detent on the base member for unlatching the resilient tongue when the clip is rotated and the tongue rides over the detent.

GARFIELD L. BECKSTROM.

REFERENCES CITED

The following references are of record in the file of this patent:

UNITED STATES PATENTS

| Number | Name | Date |
|---|---|---|
| 710,763 | Cordes | Oct. 7, 1902 |
| 827,461 | McDonald | July 31, 1906 |
| 1,111,134 | Caufield, Jr. | Sept. 22, 1914 |
| 1,398,349 | Weinman | Nov. 29, 1921 |
| 1,559,821 | Wigginton | Nov. 3, 1925 |